(12) United States Patent
Li et al.

(10) Patent No.: US 9,395,064 B2
(45) Date of Patent: Jul. 19, 2016

(54) LIGHTING DEVICE AND A ROAD LIGHTING LUMINAIRE COMPRISING THE LIGHTING DEVICE

(71) Applicant: KONINKLIJKE PHILIPS N.V., Eindhoven (NL)

(72) Inventors: Wenyi Li, Shanghai (CN); Shitao Deng, Shanghai (CN); Xiaoyan Zhu, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/359,628

(22) PCT Filed: Oct. 23, 2012

(86) PCT No.: PCT/IB2012/055823
§ 371 (c)(1),
(2) Date: May 21, 2014

(87) PCT Pub. No.: WO2013/076597
PCT Pub. Date: May 30, 2013

(65) Prior Publication Data
US 2014/0313736 A1    Oct. 23, 2014

(30) Foreign Application Priority Data

Nov. 22, 2011    (WO) ............... PCT/CN2011/082610

(51) Int. Cl.
*F21V 7/06*    (2006.01)
*F21S 8/08*    (2006.01)
(Continued)

(52) U.S. Cl.
CPC . *F21V 7/06* (2013.01); *F21S 8/081* (2013.01); *F21S 8/086* (2013.01); *F21V 7/09* (2013.01); *F21Y 2101/02* (2013.01); *Y02B 20/72* (2013.01); *Y10T 29/49826* (2015.01)

(58) Field of Classification Search
CPC ...... F21S 8/081; F21S 8/086; F21Y 2101/02; Y02B 20/72; F21V 14/00; F21V 14/02; F21V 17/02; F21V 19/02; F21V 21/14; F21V 21/30; F21V 7/06; F21V 7/07; F21V 7/08; F21V 7/09; F21V 7/041; Y10T 29/49826

See application file for complete search history.

(56) References Cited

U.S. PATENT DOCUMENTS 5,055,984 A * 10/1991 Hung et al. ............... 362/183
7,828,456 B2 * 11/2010 Boyer et al. ............. 362/153.1

(Continued)

FOREIGN PATENT DOCUMENTS

CN    2937789 Y    8/2006
CN    201110482 Y    9/2008

(Continued)

*Primary Examiner* — Bao Q Truong
(74) *Attorney, Agent, or Firm* — Meenakshy Chakravorty

(57) ABSTRACT

The invention discloses a lighting device for a road lighting luminaire and a lighting luminaire comprising the lighting device. The lighting device comprises a reflector (301), which comprises a reflecting surface (3011) formed by revolving a parabolic curve around a first axis (y) through a predetermined angle, wherein said parabolic curve has an aperture at its vertex, said first axis axis being co-planar with said parabolic curve, and extending substantially perpendicularly to the axis (x) of symmetry of said parabolic curve, and being located at or outside of said aperture of said parabolic curve. The lighting device further comprises a LED light source (302), which is disposed at an entry to said reflecting surface, with said entry corresponding to said aperture of said parabolic curve. In this way, light distribution can be controlled in the same way in any plane containing the first axis within the range of the predetermined angle. Moreover, the light distribution in any plane containing the first axis (y) can be controlled as desired by designing the parabolic curve accordingly. Thus, the lighting device can effectively reduce or eliminate the negative glaring effect and/or achieve satisfying lamination uniformity on the road surface.

15 Claims, 3 Drawing Sheets

(51) Int. Cl.
*F21V 7/09* (2006.01)
*F21Y 101/02* (2006.01)

(56) References Cited

U.S. PATENT DOCUMENTS

| | | | |
|---|---|---|---|
| 7,828,461 B2 * | 11/2010 | Mayer et al. | 362/241 |
| 8,419,215 B2 * | 4/2013 | Wang | 362/247 |
| 8,622,569 B1 * | 1/2014 | Crookham et al. | 362/145 |
| 8,714,770 B2 * | 5/2014 | Kato et al. | 362/217.06 |
| 2010/0002445 A1 | 1/2010 | Tseng et al. | |

FOREIGN PATENT DOCUMENTS

| | | |
|---|---|---|
| CN | 102168831 A | 8/2011 |
| EP | 2133621 A2 | 12/2009 |
| WO | 2005057080 A2 | 6/2005 |
| WO | 2009013771 A1 | 1/2009 |

* cited by examiner

LIGHTING DEVICE AND A ROAD LIGHTING LUMINAIRE COMPRISING THE LIGHTING DEVICE

CROSS-REFERENCE TO PRIOR APPLICATIONS

This application is the U.S. National Phase application under 35 U.S.C. §371 of International Application No. PCT/IB2012/055823, filed on Oct. 23, 2012, which claims the benefit of PCT/CN11/082610, filed on Nov. 22, 2011. These applications are hereby incorporated by reference herein.

FIELD OF THE INVENTION

The present invention relates to road lighting, particularly to a lighting device and a road lighting luminaire comprising the lighting device.

BACKGROUND OF THE INVENTION

Due to the speed of urbanization, more and more fly-overs or overpasses are built above the original traffic roads. There are various special characteristics or requirements to be met by lighting used in such places, such as ease of installation and maintenance, conformity with the construction's overall aesthetic design, anti-vibration considerations. At the same time, the general road lighting requirements should be met, such as no glare, luminance uniformity, average luminance level, etc.

Several lighting solutions are available for the application of fly-overs and overpasses, including high mast lighting and side-wall embedded luminaires.

High mast lighting has been widely and commonly used hitherto for lighting overpasses, but it has several disadvantages, including strong glare caused by the extremely high luminous flux output, difficult and expensive installation and maintenance, inevitable blind-area on the ground due to shading by the fly-over road, low utilization ratio for the fly-over application. Additionally, there is the complaint from drivers and the road lighting administrator that flourishing roadside trees block the light from the road lighting luminaire on the pole and have a negative impact on the overall luminance level and luminance uniformity, which reduces driving safety accordingly.

A side-wall embedded luminaire is another commonly used lighting option. It generally uses fluorescent lamps as the light source, and is embedded in the side wall fence at a low mounting height. It has several disadvantages, including an insufficient illuminance level for driving safety and poor illuminance uniformity.

Recently, Thorn Lighting Co. Ltd. issued a low-height mounted luminaire bearing the brand name of Orus, which is claimed to provide an anti-glare lighting solution to ramps or bridges. The luminaire uses a ceramic metal halide lamp as the light source, and its optical structure is mainly made up of a cylinder-shaped reflector, which is claimed to achieve uniform illuminance on road surfaces. However, the inventors of the present invention have observed the following disadvantages of such a luminaire:

As a light source, the ceramic metal halide lamp is large in size and shape, making it difficult for the optical design to control light intensity and/or light distribution. Moreover, the emitting surface is very bright. Therefore, direct, strong light radiation from the luminaire to the driver of an automotive vehicle is unavoidable, which causes visual discomfort to the driver's eyes, such as flickering, and hence causes safety problems.

In practical deployments, the luminaire cannot provide a satisfying level of luminance uniformity on road surfaces.

Additionally, the whole luminaire is relatively large in size and protrudes from the side-wall fence, which results in a negative effect on pedestrians and/or passing vehicles.

SUMMARY OF THE INVENTION

The present invention is an improvement over the currently available road lighting luminaire.

It would be advantageous to provide a road lighting luminaire capable of effectively reducing or eliminating the negative glare effect. It would further be advantageous to provide a road lighting luminaire capable of achieving a satisfying lamination uniformity on the road surface. It would be advantageous to provide a road lighting luminaire capable of reducing or eliminating the negative shading effect caused by trees in the street. It would be also desirable to provide a suitable optical and/or mechanical structure for a road lighting luminaire so as to achieve the above-mentioned advantages.

To better address one or more of these concerns, in a first aspect of the invention, there is provided a lighting device for a road lighting luminaire. The lighting device comprises a reflector. The reflector comprises a reflecting surface formed by revolving a parabolic curve around a first axis through a predetermined angle, wherein said parabolic curve has an aperture at its vertex, said first axis being co-planar with said parabolic curve, and extending substantially perpendicularly to the axis of symmetry of said parabolic curve, and being located at or outside said aperture of said parabolic curve. The lighting device further comprises a LED light source. The LED light source is disposed at an entry of said reflecting surface, which corresponds to said aperture of said parabolic curve. That is, when revolving the parabolic curve through the predetermined angle to form the reflecting surface, the aperture of the parabolic curve forms the entry of the reflecting surface.

By means of such a reflecting surface, light can be controlled in the same way in any plane containing the first axis within the range of the predetermined angle, because the intersection of the reflecting surface and any plane containing the first axis is the same parabolic curve. Moreover, since the light source is disposed adjacent to the vertex of the parabolic curve, almost identical light control can be achieved at any position along the revolving direction within the range of the predetermined angle.

Furthermore, the light distribution in any plane containing the first axis can be controlled as desired by designing the parabolic curve accordingly. For instance, the output beam width along the first axis depends on the maximum exit angle of the parabolic curve.

The parabolic curve refers to any curve of or like a parabola. Preferably, the parabolic curve comprises one or more conic curve segments. A conic curve segment can be a segment of a parabola, hyperbola, circle, ellipse etc. In an embodiment, the parabolic curve is the so-called compound parabolic concentrator (CPC).

According to an embodiment, the predetermined angle is in the range [90°, 180°]. The larger the predetermined angle, the wider the range is in which identical light control can be achieved. In an embodiment, the predetermined angle is 180°.

According to an embodiment, the maximum exit angle of said parabolic curve is within 5°. The maximum exit angle of the parabolic curve refers to the maximum exit angle of light from a light source disposed at the vertex of the parabolic curve with respect to the axis of symmetry of said parabolic curve.

In this way, the output beam width along the first axis can be controlled to be relatively small. In other words, the output beam achieves good directivity.

Compared with light sources such as SON, fluorescent lamps, ceramic metal halide lamps, LED light sources are small in size and have a long lifetime.

Due to the small size of the LED light source, the LED light source can be disposed at the entry of the reflecting surface even when the size of the reflector is small. As mentioned above, when the light source is disposed at the entry of the reflecting surface, namely at the vertex of the parabolic curve, almost identical light control can be achieved at any position along the revolving direction within the range of the predetermined angle. Accordingly, as far as the LED light source provides good illuminance uniformity, the output beam of the light module has good illuminance uniformity along the revolving direction within the range of the predetermined angle. Moreover, the shiny emitting surface of the light source can be also well hidden in the reflector due to the small size of the emitting surface, thereby reducing the disturbing glare effect.

In an embodiment, the LED light source comprises a multi-chip LED. Compared with a single-chip LED, the multi-chip LED can achieve a high luminous flux, and thus, the lighting device can provide sufficient luminance intensity for driving safety.

In an embodiment, the LED light source comprises more than one LED module. Thus, the lighting device is robust, because failure of one module will not result in failure of the whole lighting device.

According to another embodiment, the lighting device further comprises a base and a holding unit for holding said reflector and said LED light source. Said holding unit is rotatably connected to said base such that said holding unit is rotatable around a second axis, which is perpendicular to both the optical axis of the beam generated by said lighting device and said first axis.

In this way, by rotating the holding unit around the second axis, the direction of the optical axis of the beam generated by the lighting device is adjustable with respect to the base.

In a second aspect of the invention, there is provided a road lighting luminaire. The road lighting luminaire comprises: a support to be mounted along a road; and an aforementioned lighting device being mounted into said support such that a second axis of said lighting device is parallel to the shoulder of said road, said second axis being perpendicular to both the optical axis of the beam generated by said lighting device and said first axis.

As mentioned above, the lighting device can provide good illuminance uniformity along the revolving direction. In other words, the lighting device can provide good illuminance uniformity along the second axis. Since the lighting device is mounted such that the second axis is parallel to the shoulder of the road, the road lighting luminaire can provide good illuminance uniformity along the shoulder of the road, thereby providing good illuminance uniformity on the road surface over a large width.

In an embodiment, said lighting device is mounted at a predetermined distance from the surface of said road, wherein said predetermined distance is not higher than 1.2 m. Preferably, the predetermined distance is approximately 1.0 m.

In this way, the lighting device is mounted lower than the typical height of the driver's eye level. Moreover, the light can be well controlled beneath the driver's line of sight as long as the lighting device is mounted so that the optical axis of the beam generated by the lighting device is not directed to extend above the horizontal direction. Accordingly, the disturbing direct glare effect can be eliminated.

In another embodiment, said lighting device is mounted so that the optical axis of the beam generated by said lighting device is directed toward the center of said road.

Thus, the road surface can be efficiently illuminated.

In a third aspect of the invention, there is provided a method of mounting a lighting device as mentioned hereinabove, which comprises mounting said lighting device at a side of a road such that a second axis of said lighting device is parallel to the shoulder of said road, said second axis being perpendicular to both the optical axis of the beam generated by said lighting device and said first axis.

In an embodiment, the method further comprises mounting said lighting device at a height below 1.2 m from the surface of said road. Preferably, the lighting device is mounted at a height of about 1.0 m from the surface of the road.

In another embodiment, the method further comprises directing the optical axis of the beam generated by said lighting device toward the center of said road.

In another embodiment, the method further comprises mounting said lighting device to a side-wall fence of said road.

It is noted that the invention relates to all possible combinations of features recited in the claims.

BRIEF DESCRIPTION OF THE DRAWINGS

Other features, purposes and advantages of the present invention will become more apparent from the following detailed description of non-limiting exemplary embodiments taken in conjunction with the accompanying drawings, in which

FIGS. 3-5 illustrate a lighting device for a road lighting luminaire according to an embodiment of the present invention, wherein FIG. 3 illustrates a side view of the lighting device, FIG. 4 illustrates a top view of the lighting device, and FIG. 5 illustrates a prospective view of the lighting device.

Identical or similar reference signs indicate identical or similar devices (modules).

DETAILED DESCRIPTION OF EMBODIMENTS

A detailed description of the present invention is given below in connection with the accompanying drawings.

Figure 1:
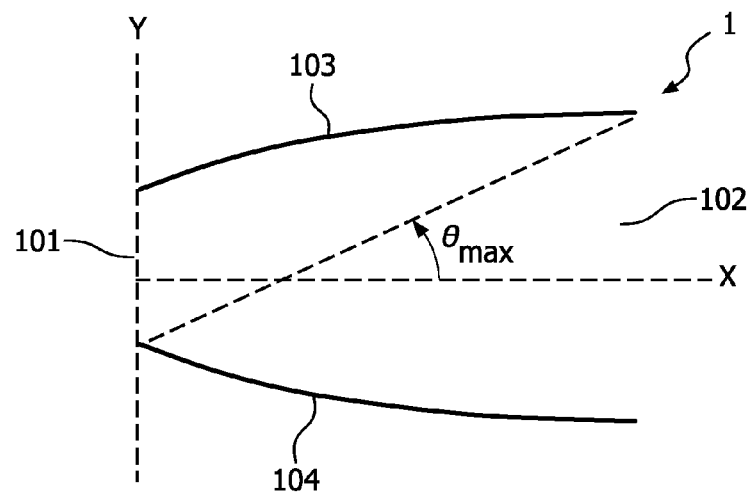
FIG. 1 illustrates a diagram for a parabolic curve as the base curve of a reflecting surface of a reflector according to an embodiment of the present invention.

FIG. 1 illustrates a diagram for the base curve of a reflecting surface of a reflector according to an embodiment of the present invention.

According to an embodiment of the present invention, a lighting device for a road lighting luminaire is provided. The lighting device comprises a reflector having a reflecting surface formed by revolving a base curve around a first axis y through a predetermined angle. The base curve is a parabolic curve 1, as shown in FIG. 1.

Referring to FIG. 1, the parabolic curve 1 has an aperture 101 at its vertex in addition to the aperture 102. Generally, the aperture 101 is smaller than the aperture 102. Hereinafter, the aperture 101 at the vertex of the aperture is referred to as entry aperture, and the aperture 102 is referred to as exit aperture, and the angle $\theta_{max}$ is referred to as the maximum exit angle of the parabolic curve 1.

The first axis y is co-planar with the parabolic curve, i.e. situated in the same plane containing the parabolic curve 1. The first axis y is substantially perpendicular to axis x, which is the axis of symmetry of the parabolic curve 1. Moreover, the first axis y is located at or outside the aperture 101. In an example, the first axis y can be located exactly at the aperture 101, as shown in FIG. 1. In another example, the first axis y can be located outside the aperture 101, namely at the left side of the aperture 101 in FIG. 1.

In some other embodiments, the parabolic curve 1 is not necessarily completely symmetrical with respect to axis x. For example, the upper half 103 of the parabolic curve 1 can be designed to be different from the lower half 104 so as to meet desired optical requirements.

As is well-known, a parabolic curve refers to any curve of or like a parabola. The parabolic curve comprises one or more conic curve segments. A conic curve segment can be a segment of a parabola, hyperbola, circle, ellipse etc. In an embodiment, the parabolic curve 1 is the so-called Compound Parabolic Concentrator (CPC).

Figure 2:
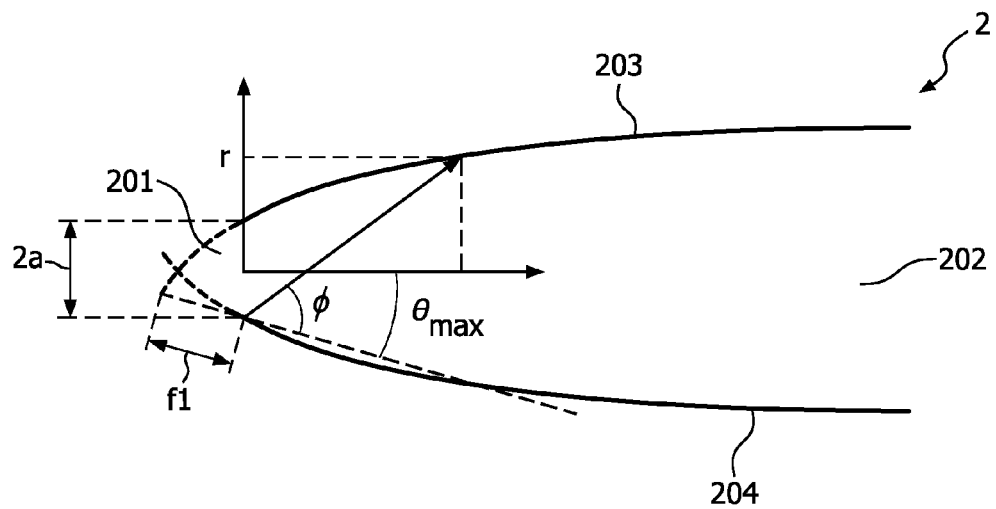
FIG. 2 illustrates a diagram for a Compound Parabolic Concentrator (CPC) as the base curve according to an embodiment of the present invention.

FIG. 2 illustrates a diagram for a Compound Parabolic Concentrator (CPC) as the base curve according to an embodiment of the present invention.

Referring to FIG. 2, CPC 2 comprises two tilted parabolas 203 and 204, and has two apertures, namely entry aperture 201 and exit aperture 202. A CPC is characterized by its acceptance angle $\theta_{max}$ and its lateral focal shift α. In the polar coordinate system shown in FIG. 2, the CPC 2 can be expressed as a function of acceptance angle $\theta_{max}$ and its lateral focal shift α, i.e.

$$r = \frac{2f_l}{1-\cos\phi}\sin(\phi - \theta_{max}) - a,$$

where $$f_l = a(1 + \sin\theta_{max})$$

As can be seen from FIG. 2, the maximum existing angle of the parabolic curve 2 is equal to the acceptance angle $\theta_{max}$, and the width of the entry aperture 201 is equal to 2α.

Figure 3:
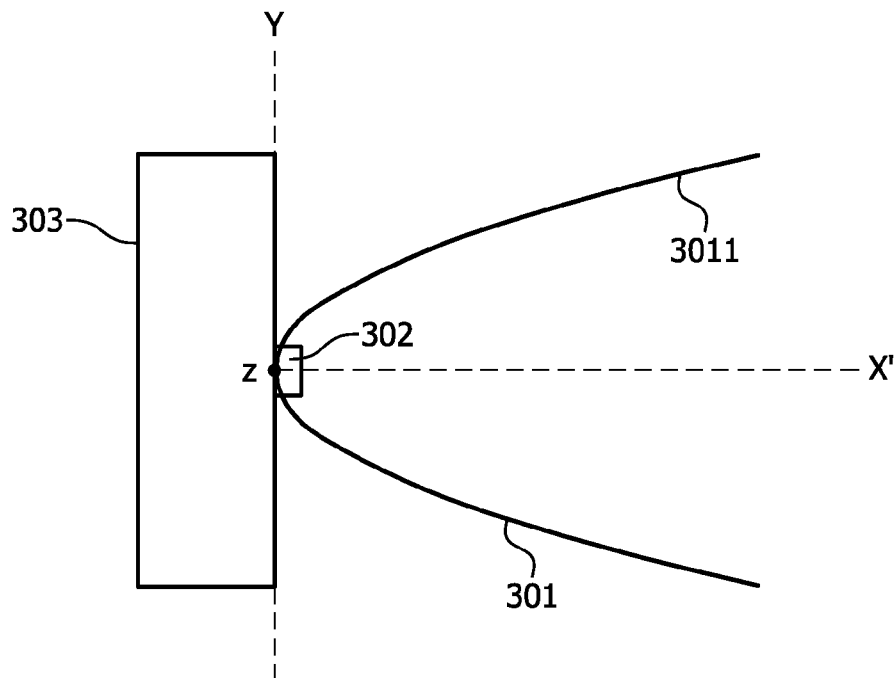
Figure 4:
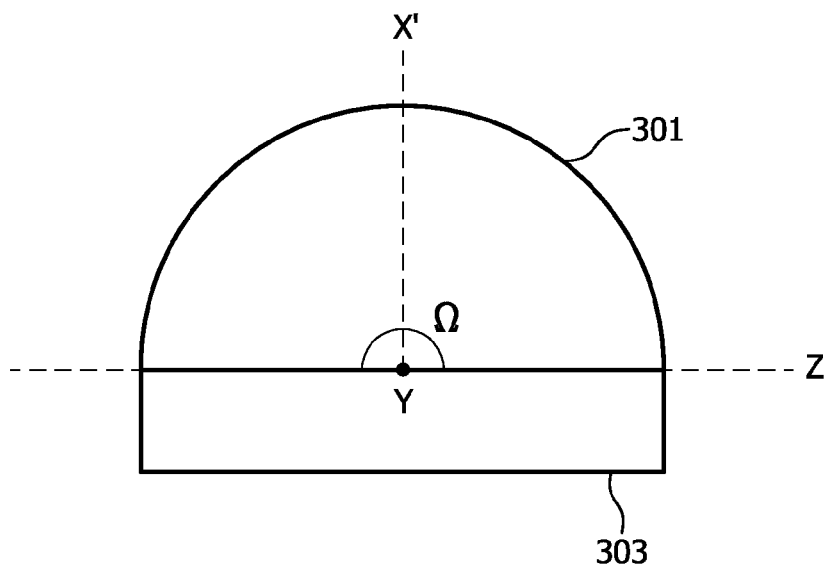
Figure 5:
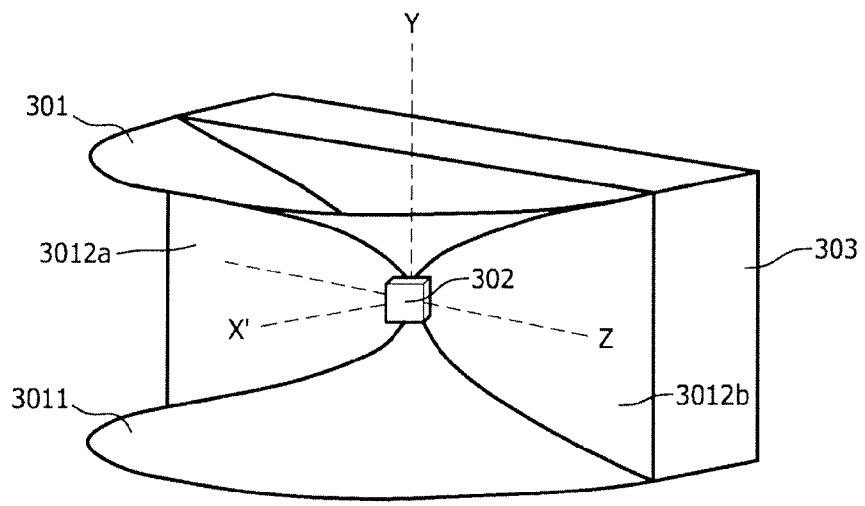

FIGS. 3-5 illustrate a lighting device for a road lighting luminaire according to an embodiment of the present invention, wherein FIG. 3 illustrates a side view of the lighting device, FIG. 4 illustrates a top view of the lighting device, and FIG. 5 illustrates a prospective view of the lighting device. The orientation of the lighting device is illustrated by axes x', y and z. In particular, axis y is the first axis of the parabolic curve for forming the reflecting surface of the reflector in the lighting device, axis x' is the optical axis of the output beam (i.e. the beam generated by the lighting device), and axis z is an axis perpendicular to both axis x' and axis y.

Referring to FIGS. 3-5, the lighting device 3 comprises a reflector 301 having a reflecting surface 3011, and a LED light source 302. The reflecting surface 3011 is formed by revolving a parabolic curve as shown in FIG. 1 around the first axis y through a predetermined angle Ω. The LED light source 302 is disposed at an entry of said reflecting surface, with the entry corresponding to the entry aperture of the parabolic curve.

In this embodiment, the predetermined angle Ω is 180°, as shown in FIG. 4. In some other embodiments, the predetermined angle Ω can have other values. Preferably, the predetermined angle Ω is in the range [90°, 180°] such as 120°, 150°.

As shown in FIG. 3 or FIG. 5, by means of the reflecting surface 3011, light from the LED light source is controlled in the same way in the vertical plane, which refers to any plane containing the first axis y, within the range of the predetermined angle Ω. This is because the intersection of the reflecting surface and the vertical plane is the same parabolic curve.

Accordingly, the exit beam angle of the output beam in the vertical plane depends on the maximum exit angle of the parabolic curve. The larger the maximum exit angle of the parabolic curve, the larger the exit beam angle in the vertical plane is. For example, the exit beam angle can be set to be within ±5°.

Additionally, the output beam of the light device 3 follows Lambertian distribution in the horizontal plane, which refers to the plane perpendicular to the first axis y.

The LED light source 302 may comprise one or more LED modules, each of which can be either a single-chip LED or a multi-chip LED. In an embodiment, the LED light source 302 can comprise a multi-chip LED so as to achieve a high luminous flux with one LED module. For example, a multi-chip LED with an effective emitting area of 6×6 mm$^2$ can support a luminous flux of over 3000 lux when being driven by a power of 30 W.

Further referring to FIGS. 3-5, the lighting device 3 further comprises a box 303 serving as a heat sink and an electrical box. The box 303 is disposed at the back of the LED light source 302.

In some other embodiments, the reflector 301 can comprise other reflecting surfaces in addition to the reflecting surface 3011. For example, the reflector 301 can comprise a further reflecting surface 3012. The reflecting surface 3012 comprises two parts 3012a, 3012b, one of which is co-planar with the parabolic curve 1 at the location where the revolving starts and the other is co-planar with the parabolic curve 1 at the location where the revolving ends. Moreover, the LED source 302 is disposed in front of the reflecting surface 3012, as shown in FIG. 5.

Figure 6:
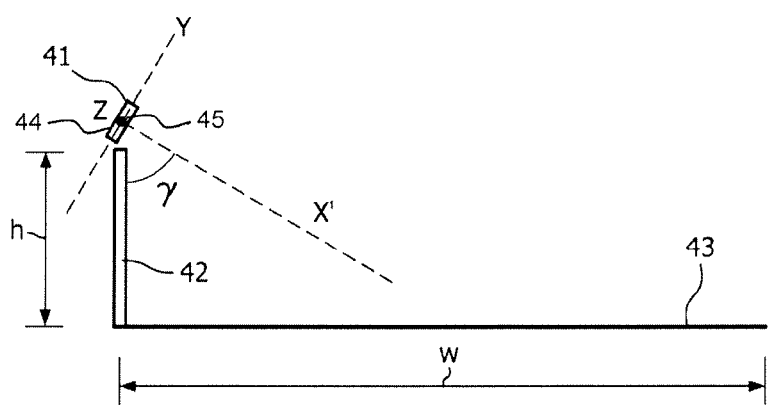
FIG. 6 illustrates a schematic view for mounting a lighting device according to an embodiment of the present invention.

FIG. 6 illustrates a schematic view for mounting a lighting device according to an embodiment of the present invention. The orientation of the lighting device is illustrated by axes x', y and z, which are the same as those in FIGS. 3-5.

Referring to FIG. 6, the lighting device 41 is used for illuminating a road having a width W. The lighting device 41 is mounted on a support 42 at a side of the road. The support 42 can be a pole or a side-wall fence. As shown in FIG. 6, the lighting device 41 is mounted with such an orientation that axis z of the lighting device 41 is parallel to the shoulder of the road.

Preferably, the lighting device 41 is mounted at a height h smaller than 1.2 m above the road surface 43. For example, the mounting height h can be 1 m from the road surface 43.

Additionally, the lighting device 41 is tilted through angle γ such that the optical axis x' of the output beam is directed to the center of the road.

In order to facilitate such tilting, the light device can further comprise an adjusting means capable of adjusting the tilting angle γ. For example, the light device can further comprise a holding unit 44 for holding the reflector and the LED light source and a base 45, wherein the holding unit 44 is rotatably connected to the base 45 such that said holding unit 44 is rotatable around axis z.

According to an embodiment of the present invention, a road lighting luminaire is provided. The lighting luminaire comprises a support to be mounted along a road, and a lighting device mounted into the support such that axis z of the lighting device is parallel to the shoulder of the road. Additionally, the lighting device is mounted at a height not exceeding 1.2 m from the surface of said road. The lighting device can be mounted so that the optical axis x' of the lighting device is directed toward the center of said road.

A person skilled in the art realizes that the present invention by no means is limited to the preferred embodiments described above. On the contrary, many modifications and variations are possible within the scope of the appended claims. It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word "comprising" does not exclude the presence of elements or steps not listed in a claim. The word "a" or "an" preceding an element does not exclude the presence of a plurality of such elements. The usage of the words first, second and third, etc., do not indicate any ordering. These words are to be interpreted as names. No specific sequence of acts is intended to be required unless specifically indicated.

The invention claimed is:

1. A lighting device for a road lighting luminaire, comprising:
    a reflector, said reflector comprising a reflecting surface formed by revolving a parabolic curve around a first axis (y) through a predetermined angle ($\Omega$), said parabolic curve having an aperture at its vertex, said first axis (y) being co-planar with said parabolic curve, and being substantially perpendicular to the axis (x) of symmetry of said parabolic curve, and being located at or outside said aperture of said parabolic curve;
    a LED light source, said LED light source being disposed at an entry of said reflecting surface, said entry corresponding to said aperture of said parabolic curve;
    a holding unit for holding said reflector and said LED light source; and
    a base, wherein said holding unit is rotatably connected to said base such that said holding unit is rotatable around a second axis (z), said axis (z) being perpendicular to both the optical axis (x') of the beam generated by said lighting device and said first axis (y).

2. A lighting device according to claim 1, wherein said parabolic curve comprises one or more conic curve segments.

3. A lighting device according to claim 2, wherein said one or more conic curve segments comprise at least one of the following:
    segment of a parabola;
    segment of a hyperbola;
    segment of a circle; and
    segment of an ellipse.

4. A lighting device according to claim 1, wherein said parabolic curve is a compound parabolic concentrator.

5. A lighting device according to claim 1, wherein the predetermined angle ($\Omega$) is in the range [90°, 180°].

6. A lighting device according to claim 1, wherein the maximum exit angle ($\theta$max) of said parabolic curve is not greater than 5°.

7. A lighting device according to claim 1 wherein said LED light source comprises a multi-chip LED.

8. A road lighting luminaire, comprising:
    a support to be mounted along a road;
    a lighting device according to claim 1 mounted into said support such that said second axis (z) of said lighting device is parallel to the shoulder of said road, said second axis (z) being perpendicular to both the optical axis (x') of the beam generated by said lighting device (41) and said first axis (y).

9. A road lighting luminaire according to claim 8, wherein said lighting device is mounted at a predetermined distance (h) from the surface of said road, said predetermined distance (h) being not higher than 1.2 m.

10. A road lighting luminaire according to claim 8, wherein said lighting device is mounted so that the optical axis (x') of the beam generated by said lighting device is directed toward the center of said road.

11. A method of mounting a lighting device according to claim 1, comprising:
    mounting said lighting device at a side of a road such that said second axis (z) of said lighting device is parallel to the shoulder of said road, said second axis (z) being perpendicular to both the optical axis (x') of the beam generated by said lighting device and said first axis (y).

12. A method according to claim 11, further comprising:
    mounting said lighting device at a height (h) smaller than 1.2 m from the surface of said road.

13. A method according to claim 11, further comprising:
    directing the optical axis (x') of the beam generated by said lighting device toward the center of said road.

14. A lighting device according to claim 4, wherein said compound parabolic concentrator comprises two tilted parabolas, and two apertures, comprising an entry aperture and an exit aperture.

15. A lighting device according to claim 7, wherein said compound parabolic concentrator is characterized by an acceptance angle and a lateral focal shift.

* * * * *